US008816968B2

(12) United States Patent
Mishra et al.

(10) Patent No.: US 8,816,968 B2
(45) Date of Patent: Aug. 26, 2014

(54) SELECTIVE MONITOR CONTROL

(75) Inventors: Kamlesh K. Mishra, Nashville, TN (US); Sanjay Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 12/903,320

(22) Filed: Oct. 13, 2010

(65) Prior Publication Data

US 2012/0092318 A1   Apr. 19, 2012

(51) Int. Cl.
G06F 3/041   (2006.01)

(52) U.S. Cl.
USPC ............... 345/173; 345/84; 345/87; 345/102; 345/156; 178/18.01; 178/18.03; 178/19.01; 178/20.01

(58) Field of Classification Search
USPC ............. 345/99, 212, 211, 103, 90, 590, 690, 345/565, 156, 173–184; 178/18.01–18.09, 178/19.01–19.04, 20.01
See application file for complete search history.

(56) References Cited

U.S. PATENT DOCUMENTS

| | | | |
|---|---|---|---|
| 5,880,719 A | | 3/1999 | Kikinis |
| 6,124,853 A * | | 9/2000 | Palalau et al. ................. 345/212 |
| 6,801,811 B2 | | 10/2004 | Ranganathan et al. |
| 7,036,025 B2 * | | 4/2006 | Hunter .......................... 713/300 |
| 7,580,033 B2 | | 8/2009 | Plut |
| 2006/0087502 A1 * | | 4/2006 | Karidis et al. ................. 345/211 |
| 2006/0132474 A1 | | 6/2006 | Lam |
| 2007/0063959 A1 | | 3/2007 | Iwabuchi et al. |
| 2007/0126729 A1 * | | 6/2007 | Yoon et al. ..................... 345/211 |
| 2010/0079595 A1 | | 4/2010 | Plut |

FOREIGN PATENT DOCUMENTS

| | | |
|---|---|---|
| EP | 0678843 A2 | 10/1995 |
| JP | 9218669 A1 | 8/1997 |

OTHER PUBLICATIONS

Iyer, Luo, Mayo and Ranganathan, Energy-Adaptive Display System Designs for Future Mobile Environments, Usenix, MobiSys '03 Tech Program Index, 2003, pp. 245-258.

* cited by examiner

*Primary Examiner* — Srilakshmi K Kumar
*Assistant Examiner* — Insa Sadio
(74) *Attorney, Agent, or Firm* — Patrick J. Daugherty; Driggs, Hogg, Daugherty & Del Zoppo Co., LPA

(57) ABSTRACT

Reducing energy usage by a monitor includes a map manager between a monitor interface and a processor that divides a display area of a monitor into areas and stores display information in a staging area. The map manager distinguishes an active window selected by a user from the remainder inactive, unselected areas of a display, and further determines a used subset of areas within the active window distinguished from the remainder unused areas as a function of a user preference. Accordingly, the map manager drives the monitor at each of the used area active window areas with the processor display information stored in the staging area at a normal luminance specified by the processor display information, and at each of the remainder unused, inactive and unselected areas of the total display area at a reduced luminance lower than the specified normal luminance.

20 Claims, 3 Drawing Sheets

SELECTIVE MONITOR CONTROL

BACKGROUND

The present invention relates to the selective energizing of portions of video monitor displays.

Reduction of power consumption by computer monitors is desired to accomplish energy savings and otherwise effect environmentally friendly or "green" information technology environments. Various schemes have been proposed for reducing energy usage by identifying opportunities for reducing energy provided to inactive screens or inactive windows within said screens. However, any such approach is limited in recognizing and realizing available energy expenditure and light emissions savings while still meeting the needs of a user of the screen.

BRIEF SUMMARY

One embodiment of the present invention is a method for reducing energy usage by a monitor which includes dividing a display area of a monitor into areas and storing display information from a processor in a staging area in response to a display instruction from the processor. A top-focused active window selected by a user is distinguished within the processor display information from the remainder of inactive and unselected areas of a total display area and has a top-focused plurality of the areas. The method also includes determining that a subset of a totality of the top-focused areas comprehends a used window area distinguished from a remainder of the unused area of the top-focused window areas as a function of a user preference. According, the method drives the monitor at each of the used area subset top-focused window areas with the processor display information stored in the staging area at a normal luminance specified by the processor display information, and at each of the remainder, unused and unselected areas of the total display area at a reduced luminance that is lower than the normal luminance specified by the processor display information.

In another embodiment, a computer system for reducing energy usage by a monitor includes a map manager between a monitor interface and a processor wherein the map manager divides a display area of a monitor into areas and stores display information from the processor in a staging area in response to a display instruction from the processor. The map manager further distinguishes a top-focused active window selected by a user within the processor display information from a remainder inactive unselected area of a total display area of the processor, the top-focused active window comprising a top-focused plurality of the areas. The map manager determines that a subset of a totality of the top-focused plurality of areas comprises a used window area distinguished from a remainder unused area of the top-focused window areas plurality as a function of a user preference. Accordingly, the map manager drives the monitor at each of the used area subset top-focused window areas with the processor display information stored in the staging area at a normal luminance specified by the processor display information; and at each of the remainder unused, inactive and unselected areas of the total display area at a reduced luminance that is lower than the normal luminance specified by the processor display information.

In another embodiment, a computer program product for reducing energy usage by a monitor includes a computer readable storage medium and program instructions stored thereon. The program instructions are to divide a display area of a monitor into at least one plurality of areas and store display information from a processor in a staging area in response to a display instruction from the processor. The instructions are also to distinguish a top-focused active window selected by a user within the processor display information from a remainder inactive unselected area of a total display area of the processor, and to determine that a subset of a totality of the top-focused plurality of areas within the active window define a used window area distinguished from a remainder unused area of the active window as a function of a user preference. Lastly, the instructions are also to drive the monitor at each of the active window used areas with the processor display information stored in the staging area at a normal luminance specified by the processor display information, and at each of the remainder of the active window unused areas and inactive unselected areas of the total display area at a reduced luminance that is lower than the normal luminance specified by the processor display information.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
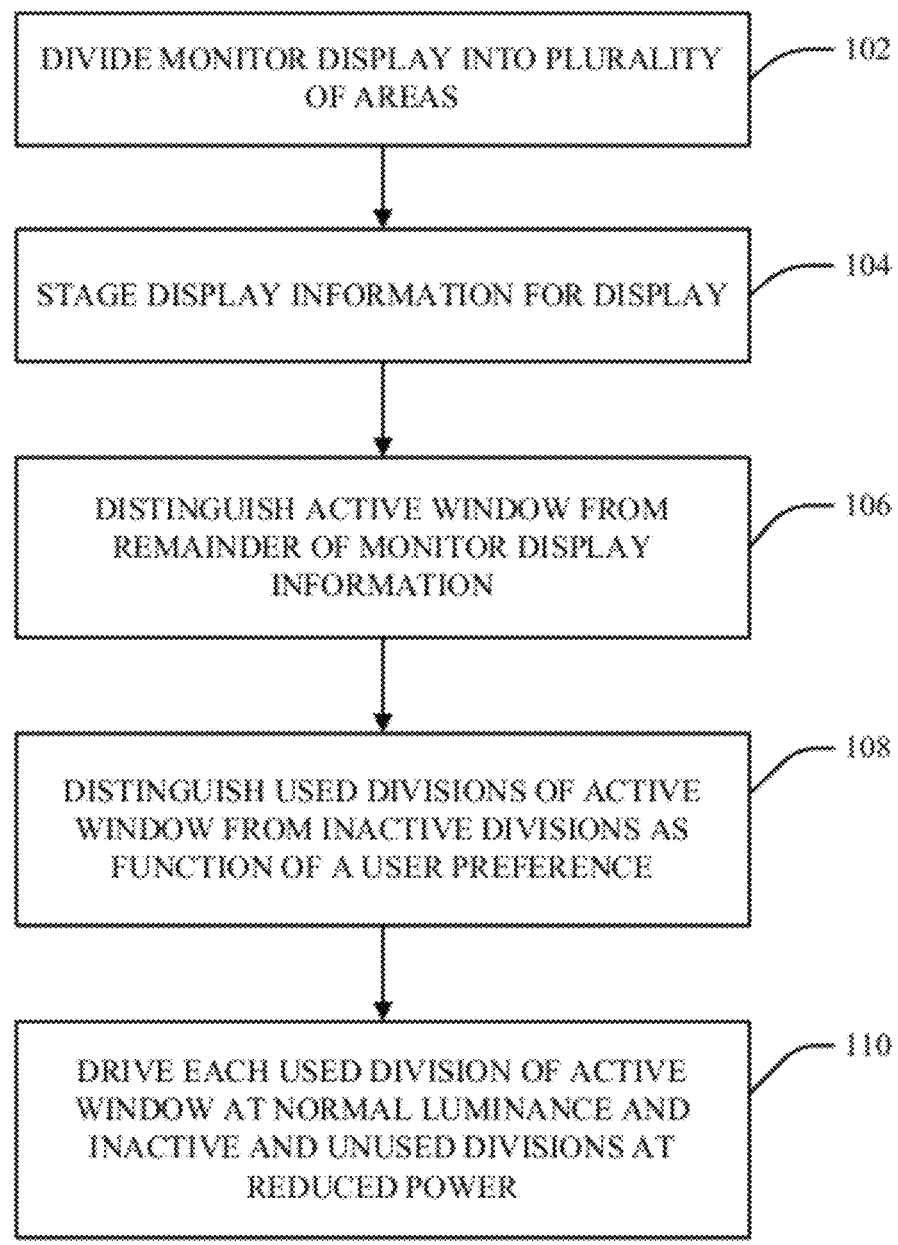
FIG. 1 illustrates an embodiment of a method or system according to the present invention for reducing energy usage by a monitor as a function of partial screen area activity.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an embodiment of a method or system for reducing energy usage by a monitor as a function of partial screen area activity according to the present invention is illustrated. At 102 a map manager interposed or otherwise provided between a monitor interface and a processor divides a display area of a monitor into one or more pluralities of areas. Division of the display area of the monitor for a color generation process according to the present embodiment includes two types of plurality divisions (though other embodiments may practice more or less), physical divisions into area blocks or cells of back lights, and logical divisions of blocks or cells of color information arrangement for luminance of cells. More particularly, the monitor display is physically and logically divided into blocks or cells that may each be selectively and separately driven at discrete luminance and/or backlight values. In some embodiments, back-light blocks/cells are different from color luminance blocks/cells, and wherein each of the pluralities are controlled by separate display controller components, and they may also differ in number and size of blocks.

Either or both of the back-light physical division and the logical division of the color luminance logical division may be a user selection, or they may be predetermined or implemented, for example by a display manufacturer, manager entity or service provider. Embodiments using multiple types of logical and physical divisions may thus provide additional energy savings capabilities; for example, some portions of the display area may be selected to receive full color lumen data but no backlight energy, others backlight but low-energy level lumen data, still other alternating combinations, and wherein any specific combination may be selected to maximize energy savings, extend display service life, or serve some other parameter or objective.

It will also be apparent that increasing the granularity of either of the backlight physical divisions or the color luminance logical divisions will increase the amount of emission control possible, thus increasing possible power savings through reducing areas of the monitor needlessly backlit or driven at full color luminance. Further, backlight power is not required while RGB color information is altered in a refresh, offering additional energy saving in a refresh of such divisions, cells or screen areas.

At 104 the map manager stores display information from the processor in a staging area in response to a display instruction from the processor. At 106 the map manager distinguishes a top-focused active window selected by a user within the processor display information from a remainder, inactive and unselected area of a total display area of the processor, and wherein the top-focused active window comprises a plurality of the division blocks.

At 108 the map manager utilizes a user preference to determine a subset or portion of a totality of the top-focused window division blocks defining a used area as distinguished from a remainder of the top-focused window division blocks that are actually unused. More particularly, after receipt of a user's preference input as a display choice, at 110 the map manager causes the monitor to be driven by the processor display information by (i) driving the monitor at the used area subset division blocks of the top-focused window with full backlight intensity and with the processor display information stored in the staging area at a color luminance level provided by the processor display information (for example, an original or specified luminance provided by the display information; and (ii) reducing a color luminance level of the monitor and/or causing a low or no backlight intensity at the remaining unused division blocks of the top-focused window, as well as at the rest of the display (i.e. the remainder inactive, unselected area of the total display area, that area outside of the top-focused window), resulting in lower power outputs and/or a lower level of color luminance at the used area subset division blocks of the top-focused window.

Energizing only active, used portions of a monitor surface according to the present invention may thereby reduce total energy usage and emission of light from a video display computer monitor, in some examples resulting in savings of approximately 70% to 80% of total power consumption over prior art methods which typically effect power savings by either sending an entire display area into a stand-by mode for power saving wherein nothing is visible on the screen while in power saving mode, including active areas of interest to a user. Other methods may distinguish active windows from other inactive areas, but they provide no teachings with respect to realizing energy savings through differentiated luminance energy usage within different regions of an active window.

According to the present invention, the lower luminance level of the unused division blocks of an active window and the remainder, inactive display areas outside of the active window may be one or both of a no-power (for example, no backlight power) and a no-color luminance data level. It may also be a lower emission, predefined color combination that minimizes radiation emissions; for example, some RGB color tones may have higher radiation emissions than others, and accordingly those high-emission tones may be minimized or eliminated for the low-level setting. For example, in some embodiments, lower luminance level color combinations comprise low-contrast combinations selected and provided to the active/unused and inactive division blocks in order to replace and avoid high-contrast color combinations present in original RGB input information as rendering high-contrast images may require higher emissions by a monitor, substituting low-contrast combinations, or reducing the color contrast in the original input color information, enables further energy savings over the prior art.

The substitute or color combination alteration practices by the present invention may be user-specified. For example, predefined color combinations may be provided to the map manager to account for user color blindness, the color tones of the lower luminance levels selected to avoid combinations that may be unintelligible for those with color blindness, to instead provide certain contrasting color tones to enable a color-blind user to distinguish distinct display elements within the low-level active/unused and inactive areas (for example, window boundaries, elements within inactive windows and tool bars, etc). The term "color-blindness" refers to a variety of different conditions. Illustrative but not exhaustive examples include protanopia, the absence of red sensitivity, also referred to as red dichromacy; protanomalia, a red weakness; deuteranopia, the absence of green sensitivity, also referred to as green dichromacy; deuteranomalia, green weakness; tritanopia, the absence of blue sensitivity, also referred to as blue dichromacy; and, theoretically, tritanomalia, blue weakness. Optimizing color levels to account for one or more of these different color-blind conditions may be ineffective or even deleterious with respect to accounting for others; thus, embodiments of the present invention may allow for user selection or customization of color tone combinations for known user requirements (i.e. one combination for a red weakness, another different one for a blue dichromacy, etc.)

In another aspect, activating or powering only a used/active portion of a monitor surface may correspondingly reduce an amount of eye strain experienced by a user in using and reading information from a monitor surface.

Figure 2:
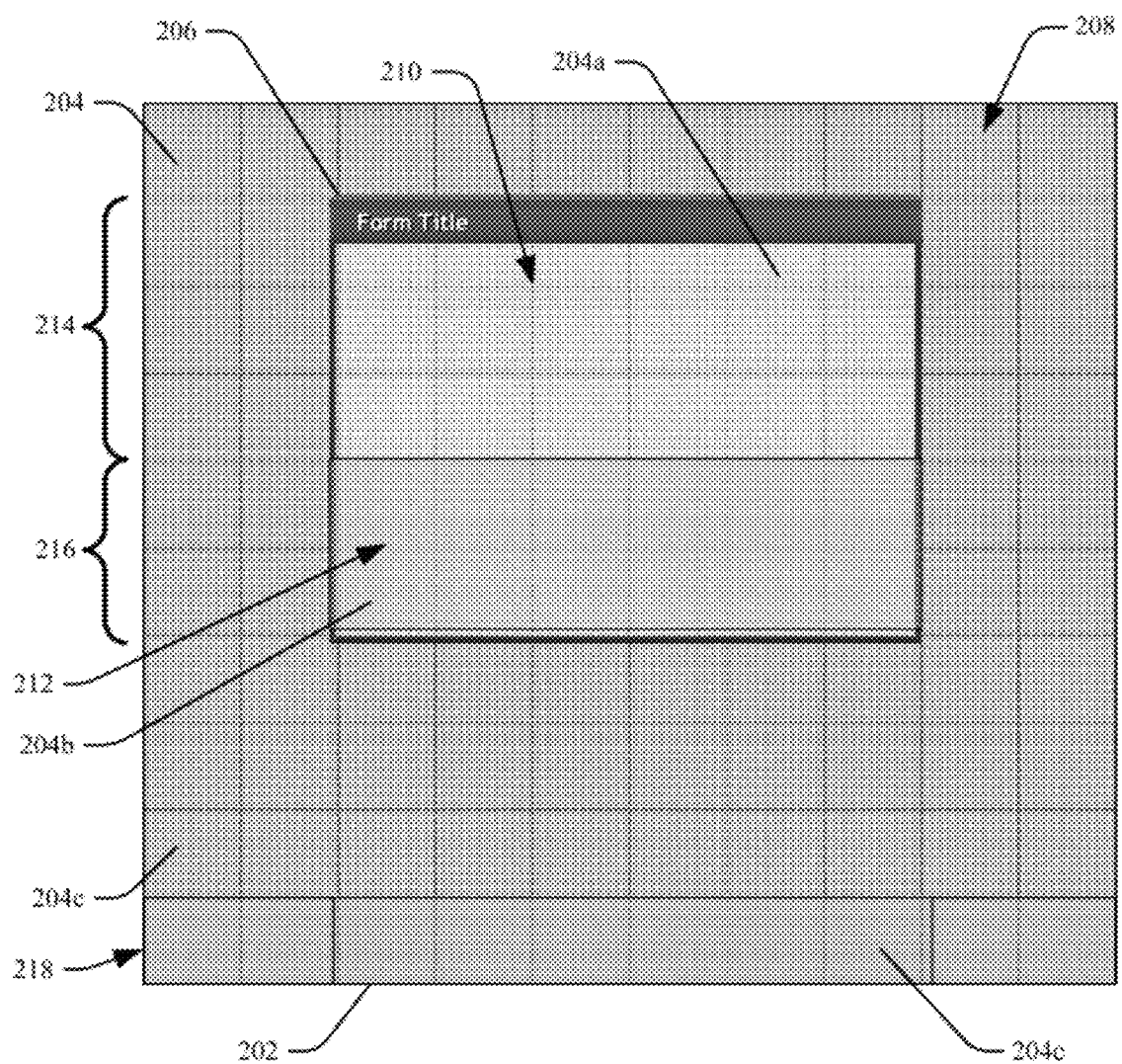
FIG. 2 illustrates a monitor surface logically divided according to the present invention.

FIG. 2 illustrates a monitor surface 202 divided into a grid of division blocks or cells 204. The processor display information comprises an active area 206, which is a top-focused screen element in active use by user of a computer system in communication with the monitor. Typically, the active area 206 is an application window 206 on a desktop display 202 which enables a user to interact with data and process associated with said application. Illustrative but not exhaustive examples of windows 206 include those provided and configured by operating systems such as WINDOWS (WINDOWS is a trademark of the Microsoft Corporation in the United States or other countries), MAC OS X (MAC OS X is a trademark of the Apple Corporation in the United States or other countries), LINUX (LINUX is a trademark of the Linux Foundation in the United States or other countries), and still others appropriate for use with the present invention will be apparent to one skilled in the art. The window 206 may be recognized or designated as active in response to a variety of inputs from several input devices, for example from a graphical user interface (GUI) mouse, keyboard, cursor, etc. or through an operating system or application routine.

According to the present invention, the active window/area 206 is further divided into a used area 210 and an unused area 212 as a function of a division of the display surface of a target monitor, wherein the map manager may generate different color information and backlight intensities for each of the division blocks 204 of each of the areas 210/212. The inactive area 208 of the display 202 is defined as the remainder of the total display area 202 not included within the active window 206. These include blocks 204c which are not otherwise selected by the user, and accordingly which may have no or lower power consumption.

The active/used areas 210 and active/unused areas 212 may be defined by a user, system or administrator through a variety of methods. In the present example, the user-defined used area 210 is defined to comprise each of the blocks 204a that are both within the three rows 214 of blocks that are encompassed within an upper or top area of the active window 206 and including an area being used by the user within the active window 206 (for example, including a cursor or text being edited or selected by the user, etc.). The blocks 204b within the next two, lower rows 216 may thus be treated like the blocks 204c outside of the active window 206 in the inactive area 208, wherein each of the blocks 204b and 204c may have a lower or no backlight or color luminance, thereby providing energy efficiencies greater than that obtained by prior art methods wherein all of the entire active window/area 206 has a higher or full luminance.

Other embodiments may use other user-selection criteria. In one example, used/unused area criteria include selecting a specified number of horizontal rows and vertical columns within an active window that are proximate to a focal point (for example, cursor, text being read, highlighted or edited, etc.), for example including the focal point. An entire active sub-area or window, radio button, dialog box or other discrete area within the active window 206 may be specified. Corner cells about a focal point or other pre-defined cells may be selected to demarcate boundaries of an area or window of interest, for example identifying only those cells including a portion of text or item selection, or those one or two cells or other range of cells surrounding a focal point. Still others will be apparent to one skilled in the art.

User or system preferences may thus be provided to the map manager, in some embodiments from a computer-readable storage medium in communication with the map manager. Used/active area 210 selection may be manually triggered by a user, for example through use of a dedicated hardware button or selection of a GUI input by a cursor. It may also be automatically initiated by an application or a device driver, for example as a default power-saving setting that may be deselected by a user, in some instances as part of a screen-saver or other power management options In some embodiments, differing levels of low/no luminance may be practiced within the respective blocks 204b/204c. For example, the unused blocks 204b within the active window 206 may be visually distinguished from the inactive area 208 blocks 204c through use of a different lower luminance level and/or backlight intensity, or with a low level wherein the inactive blocks 204c have no luminance, etc. For example, in one embodiment, both the active window/unused blocks 204b and the inactive area/unused blocks 204c may receive a same lower luminance level, but wherein the active window/unused blocks 204b receive backlight power and the inactive area/unused blocks 204c are instead powered off and receive no backlight power. Still other combinations will be apparent to one skilled in the art.

Some areas within the display may also receive different, distinguishing treatment as a function of unique status. For example, a task bar area 218 (at the bottom of the screen in the present example) may be designated as a permanent area 218 wherein it may remain illuminated at a higher level relative to the other unused blocks 204b and 204c, in some examples at a level equivalent to the used/active blocks 204a.

Figure 3:
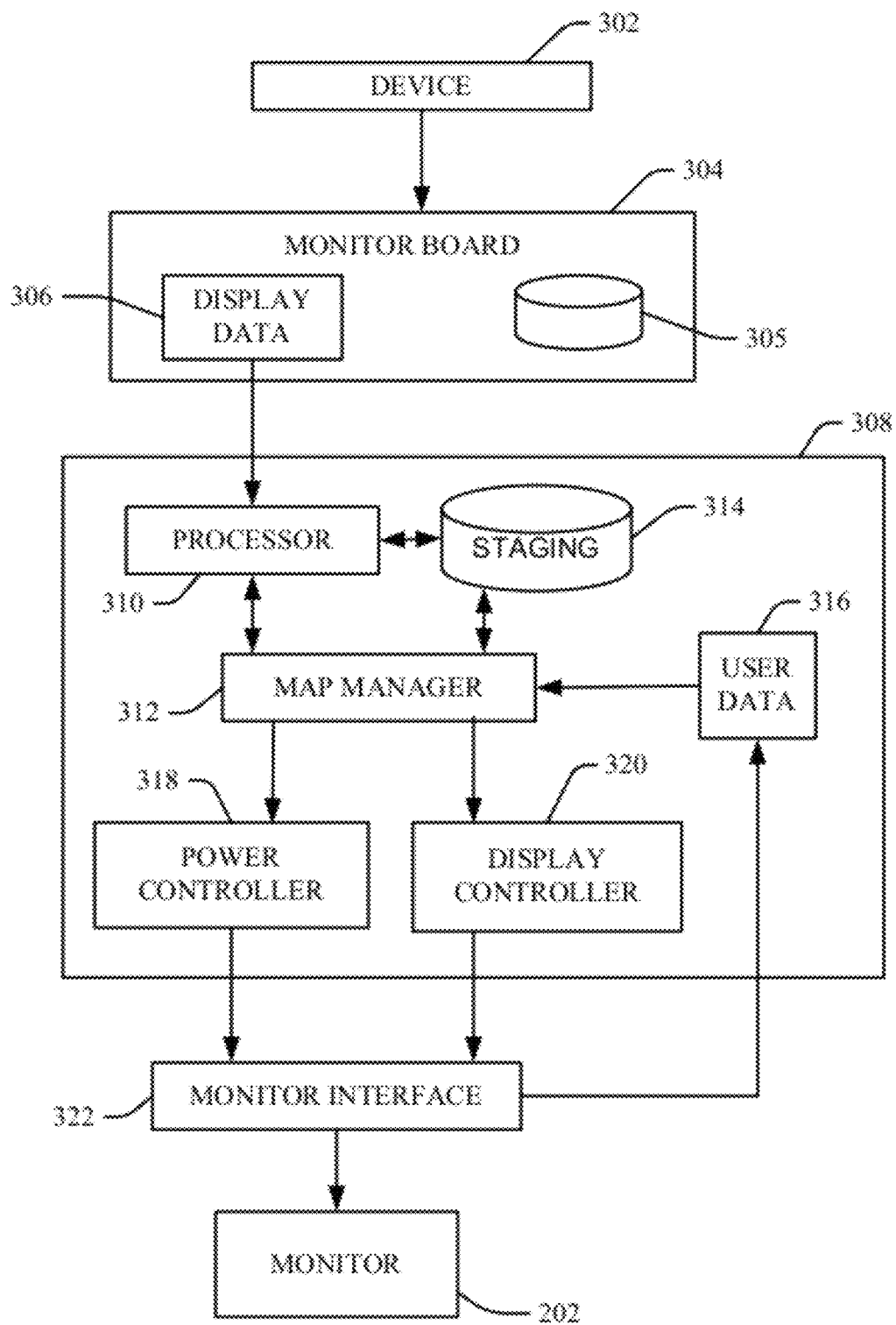
FIG. 3 is an illustration of a computerized implementation of an embodiment of the present invention.

FIG. 3 provides an exemplary implementation of an embodiment of the present invention, for example of the method and process of FIG. 1 discussed above. A device 302 driving a monitor display comprises or is in communication with a main monitor board 304 which outputs display information through an RGB color information interface 306 for driving a display monitor 202. The device 302 may be a computer or other programmable device, or it may be a non-programmable device, for example a television or camera circuit 302. A map manager circuit 308 is interposed between the display 202 and the main monitor board 304 and comprises a microprocessor or other processing device 310 in circuit communication with the RGB output interface 306. A map manager device 312 is in circuit communication with the processor 310 and with a staging area memory device 314. In response to (as a function of) user (or default) selection criteria 316, the map manager 312 divides the monitor display into a plurality of blocks or cells (for example the blocks 204 of FIG. 2).

The map manager 312 communicates with the processor 310 and receives instructions to read data from the staging area 314 and maps the data to the monitor interface 322 to focus light accordingly on the display screen 202 as a function of the user selection data 316 input. The user selection data 316 is in communication with the monitor 202, wherein the differential division block emission process and system may be activated through initiation of a button on the physical monitor 202 by a user, and wherein the monitor 202 may also provide feedback to the circuit 308 in some examples. The processor 310 may be responsible for a variety of process executions, for example including a color generation request from the map manager 312 for the active area/unused section 212; understanding or defining the active area/window 206 or used portion thereof 210; processing of a power circuit request for the map manager 312 to enable a back light for the active/used area portion 210; sending color information to divisions 204a for the active/used area portion 210; providing data in response to a color information request from the map manager 312 if a user changes a display choice; and receiving Z-Order information from a Video Graphics Array (VGA) input from the RGB color information interface 306. It will be understood that the term "Z-order" refers to the ordering of objects in a display with respect to a Z-axis in coordinate geometry, where X refers to a horizontal axis (left to right) and Y to a vertical axis (up and down), and Z refers to the axis perpendicular to the other two (forward or backward). Thus, if application windows in a GUI are considered as a series of planes parallel to the surface of the monitor, the windows are typically stacked along the Z-axis, and the Z-order information thus specifies the front-to-back ordering of the windows on the screen, with a top window sheet having the highest Z value.

In contrast to prior art methods, embodiments of the present invention divide the monitor display area into one or more pluralities of divisions or cells wherein each may be managed with a different controller. In the present embodiment, the monitor display blocks 204 may be selectively driven at discrete luminance and backlight values by the map manager 312 through use of a power controller 318 and a separate display controller 320 in communication with a monitor interface 322, for example, through use of separate Electrically Erasable Programmable Read-Only Memories (EEPROM's) 318/320.

The physical division of backlight arrangement for powering the display screen 202 is achieved through use of the power controller 318. At system boot, it may provide power to all screen blocks 204, and by default after receipt of a Z-Order it may set for active screen-only with full intensity at the used area screen blocks 204a. After receipt of user's input data 316 as a display choice, the power controller 318 may provide power wherein the intensity at each of the used/active area 210 blocks 204a will be high, and each of the active/unused area 212 blocks 204b will be low; thus, a separate backlight may be provided for each physical division block 204. This is contrasted with prior art liquid crystal (LCD) display methods which generally require uniform backlighting and provide no mechanism to selectively control backlighting in unused sections of active monitors, for example wasting power in lighting white unused screen areas.

In a second type of division, a logical division of color information arrangement for luminance of logically-divided cells 204 comprises generation of two different color information outputs by the display controller 320, one for the used/active area 210 and the other for the active/unused area 212. Thus, the map manager may send the respective logical blocks 204 of information for the used/active area 210 and the active/unused area 212 as well as actual color information from the staging area 314, generally generating colors with less luminance for the active/unused area 212 after conversion of actual colors for the used/active area 210.

As discussed generally above, in some embodiments, backlight luminance blocks controlled by the power controller 318 may differ from luminance blocks controlled by display controller 320, and more particularly they may differ in number and/or size of blocks. Either or both of the physical division of each of the backlight blocks or cells and the logical division of the color luminance blocks or cells may be a user selection, for example a decision of a display manufacturer. Embodiments using multiple types of logical divisions may thus provide additional energy savings capabilities; for example, active area/unused blocks 204b and inactive area blocks 204c may be selected to receive full color lumen data but not backlight energy, or backlight but low-energy level lumen data, or alternating combinations with respect to inactive area blocks 204c which are in a permanent area task bar, etc., and wherein a specific combination may be selected to maximize energy savings, extend display service life, or serve some other parameter or objective. Further, backlight power is not required while RGB information is altered in a refresh or otherwise of an active area/unused block 204b or an inactive block 204c according to the present invention.

Staging RGB and backlight information in the staging area 314 before the monitor interface 322 enables further energy efficiencies over the prior art. The staging area 314 stores RGB data from the source (for example, main monitor board 304) and caters as the RGB source for the monitor interface 322. The map manager 312 may map as per the staging area 314 data onto the monitor screen 204 for pixel to pixel, and once mapped a monitor refresh is performed. In one aspect, timely refreshment of RGB generation in the display 202 need only involve the active area/used blocks 204a, and not the other blocks 204b and 204c, and may further require RGB refresh only at times required by the active area/used monitor blocks 204a as indicated by the interface 322. This provides further energy savings over prior art methods that refresh the entire screen, in one aspect as refresh timing is different from standard and whole-screen refreshing.

The processor 310 receives user selection and other input data 316 from the map manager 312 and directs the map manager 312 to read the display information from staging area 314. Once data is available to processor 310 and it receives acknowledgement from the staging area 314, it sends instructions for color generation as per the user's input 316. Prior art light-emitting diode (LED) display methods are generally unable to find the last data of inactive sections once an LED display has been turned off; to remember a last-used screen emission profile, those LED's with lesser illumination must be powered on those, thus needlessly energizing some portions of the display when the LED monitor is turned back on. In contrast, embodiments of the present invention may retrieve color information data relative to previously inactive sections from the staging area 314 before turning the monitor back on; there is no need to power the unused portions at power on.

In some embodiments, the distinguishing active area/used blocks 204a from area/unused blocks 204b and inactive area blocks 204c may be through a Boolean logic "AND" process, thus sending the higher energy levels only to blocks that are both in an active window and identified as used through application of the user selection criteria 316. In one embodiment, the user selection data 316 and active areas determination are part of the map manager 312, with the used and unused area determinations inputs for the power controller 318 and the display controller 320 for their processing, the display controller 320 generating colors with less luminance for the unused area 208.

The implementation of the map manager circuit 308 in FIG. 3 comprises various components, some of which are illustrated. More particularly, it will be understood that the device 302 and the map manager circuit 308 may include processing units, inclusive of central processing units (CPU's), for example the processor 310 in communication with one or more external I/O devices/resources 304 and 322 and which may include computer-readable storage systems (for example, 314, 316, 305, etc.). In general, the processing unit 310 and map manager 312 may execute computer program code, such as the code to implement one or more of the process steps illustrated in FIG. 1, which may be stored in the memories 314, 316 and/or 305.

One embodiment performs process steps of the invention on a subscription, advertising, and/or fee basis. That is, a service provider could offer to reduce energy usage by a monitor as a function of partial screen area activity. In this case, the service provider can create, maintain, and support, etc., a computer infrastructure, such as all or part of the network computer infrastructure of FIG. 3 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles for reducing energy usage by a monitor as a function of partial screen area activity as described above. In this case, a computer infrastructure, such as all or part of the computer infrastructure of FIG. 3, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 302/304/308, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g., a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for reducing energy usage by a monitor, the method comprising:
   a processing unit initiating dividing a display area of a monitor into a grid of a different blocks, wherein the processing unit is interposed between the monitor and a main monitor board; the processing unit initiating distinguishing a first plurality of the blocks that are each within a top-focused active window within display information that is output by the main monitor board, from a remainder second plurality of the blocks, wherein the remainder second plurality of the blocks are each within a remainder inactive and unselected area of a total display area of the monitor that is different from the top-focused active window;
   the processing unit selecting a first subset of the top-focused active window first plurality of blocks that are each proximate within a specified number of horizontal rows or vertical columns of the blocks to a focal point within the top-focused active window, wherein the first subset of the top-focused active window first plurality of blocks is distinguished from a remainder second subset of the first plurality of blocks of the top-focused active window;
   the processing unit driving the first subset of the first plurality of blocks of the top-focused active window display area of the display area of the monitor with display information at a normal level of color luminance and at a normal level of backlight power;
   the processing unit driving the second remainder subset of the first plurality of blocks of the top-focused active window display area of the monitor at the normal level of backlight power, and at a reduced level of color luminance that is lower than the normal level of color luminance; and
   the processing unit driving of the remainder second plurality of the blocks within the remainder inactive and unselected area of a total display area of the monitor at the reduced level of color luminance, and at a reduced level of backlight power that is lower than the normal level of backlight power.

2. The method of claim 1, wherein the reduced level of backlight power is no backlight power.

3. The method of claim 1, wherein the reduced level of color luminance level comprises contrasting color tones selected to allow a specific user to distinguish distinct display elements within the second remainder subset of the first plurality of blocks of the top-focused active window display area of the monitor, and wherein the contrasting color tones are selected to be intelligible to a user having one or more of protanopia, protanomalia, deuteranopia, deuteranomalia, tritanopia and tritanomalia.

4. The method of claim 1, wherein the specified number of horizontal rows or vertical columns of the blocks to the focal point within the top-focused active window is three horizontal rows of the blocks that are within an upper area of the top-focused active window and include the focal point.

5. The method of claim 1, further comprising:
   visually distinguishing a first task bar subset group of the second plurality of the blocks within the remainder inactive and unselected area of the total display area of the monitor from another subset group of the second plurality of the blocks within the remainder inactive and unselected area of the total display area, by driving the first task bar subset group blocks with display information at the normal level of color luminance and at the normal level of backlight power.

6. The method of claim 1, wherein the reduced level of color luminance comprises a predefined low-contrast color combination that causes the monitor to emit a first amount of radiation in rendering the display information from the main monitor board; and
   wherein the normal level of color luminance comprises a high-contrast color combination that causes the monitor to emit a second amount of radiation in rendering the display information from the main monitor board that is a higher than the first amount of radiation emitted by the monitor.

7. The method of claim 1, wherein the top-focused active window is a one of a plurality windows in the display information from the main monitor board that has a highest Z-order value.

8. The method of claim 1, further comprising:
   integrating computer-readable program code into a computer system comprising a processing unit, a computer readable memory and a computer readable hardware device;
   wherein the computer readable program code is embodied on the computer readable storage hardware device and comprises instructions that, when executed by the processing unit via the computer readable memory, cause the processing unit to perform the steps of initiating the dividing the display area of the monitor into the grid of different blocks, the distinguishing the first plurality of the blocks within a top-focused active window from the remainder second plurality of the blocks, the selecting and driving the first subset of the first plurality of blocks with display information at the normal level of color luminance and at the normal level of backlight power, the driving the second remainder subset of the first plurality of blocks at the normal level of backlight power and at the reduced level of color luminance, and the driving of the remainder second plurality of the blocks at the reduced level of color luminance and at the reduced level of backlight power.

9. A system, comprising:
   a processing unit interposed between a monitor and a main monitor board and in communication with a computer readable memory and a computer-readable storage hardware device;
   wherein the processing unit, when executing program instructions stored on the tangible computer-readable storage medium via the computer readable memory:
   initiates dividing of a display area of the monitor into a grid of different blocks;
   initiates distinguishing of a first plurality of the blocks that are each within a top-focused active window within display information that is output by the main monitor board, from a remainder second plurality of the blocks, wherein the remainder second plurality of the blocks are each within a remainder inactive and unselected area of a total display area of the monitor that is different from the top-focused active window;

selects a first subset of the top-focused active window first plurality of blocks that are each proximate within a specified number of horizontal rows or vertical columns of the blocks to a focal point within the top-focused active window, wherein the first subset of the top-focused active window first plurality of blocks is distinguished from a remainder second subset of the first plurality of blocks of the top-focused active window;

drives the first subset of the first plurality of blocks of the top-focused active window display area of the display area of the monitor with display information at a normal level of color luminance and at a normal level of backlight power;

drives the second remainder subset of the first plurality of blocks of the top-focused active window display area of the monitor at the normal level of backlight power, and at a reduced level of color luminance that is lower than the normal level of color luminance; and drives the remainder second plurality of the blocks within the remainder inactive and unselected area of a total display area of the monitor at the reduced level of color luminance, and at a reduced level of backlight power that is lower than the normal level of backlight power.

10. The system of claim 9, wherein the reduced level of backlight power is no backlight power.

11. The system of claim 9, wherein the reduced level of color luminance level comprises contrasting color tones selected to allow a specific user to distinguish distinct display elements within the second remainder subset of the first plurality of blocks of the top-focused active window display area of the monitor, and wherein the contrasting color tones are selected to be intelligible to a user having one or more of protanopia, protanomalia, deuteranopia, deuteranomalia, tritanopia and tritanomalia.

12. The system of claim 9, wherein the specified number of horizontal rows or vertical columns of the blocks to the focal point within the top-focused active window is three horizontal rows of the blocks that are within an upper area of the top-focused active window and include the focal point.

13. The system of claim 9, wherein the processing unit, when executing the program instructions stored on the computer-readable storage medium via the computer readable memory, further initiates visually distinguishing a first task bar subset group of the second plurality of the blocks within the remainder inactive and unselected area of the total display area of the monitor from another subset group of the second plurality of the blocks within the remainder inactive and unselected area of the total display area, by driving the first task bar subset group blocks with display information at the normal level of color luminance and at the normal level of backlight power.

14. The system of claim 9, wherein the reduced level of color luminance comprises a predefined low-contrast color combination that causes the monitor to emit a first amount of radiation in rendering the display information from the main monitor board; and wherein the normal level of color luminance comprises a high-contrast color combination that causes the monitor to emit a second amount of radiation in rendering the display information from the main monitor board that is a higher than the first amount of radiation emitted by the monitor.

15. An article of manufacture, comprising:

a computer readable storage hardware device having computer readable program code embodied therewith, the computer readable program code comprising instructions that, when executed by a computer processing unit that is interposed between a monitor and a main monitor board, cause the computer processing unit to:

initiate dividing of a display area of the monitor into a grid of different blocks;

initiate distinguishing of a first plurality of the blocks that are each within a top-focused active window within display information that is output by the main monitor board, from a remainder second plurality of the blocks, wherein the remainder second plurality of the blocks are each within a remainder inactive and unselected area of a total display area of the monitor that is different from the top-focused active window;

select a first subset of the top-focused active window first plurality of blocks that are each proximate within a specified number of horizontal rows or vertical columns of the blocks to a focal point within the top-focused active window, wherein the first subset of the top-focused active window first plurality of blocks is distinguished from a remainder second subset of the first plurality of blocks of the top-focused active window;

drive the first subset of the first plurality of blocks of the top-focused active window display area of the display area of the monitor with display information at a normal level of color luminance and at a normal level of backlight power;

drive the second remainder subset of the first plurality of blocks of the top-focused active window display area of the monitor at the normal level of backlight power, and at a reduced level of color luminance that is lower than the normal level of color luminance; and drive the remainder second plurality of the blocks within the remainder inactive and unselected area of a total display area of the monitor at the reduced level of color luminance, and at a reduced level of backlight power that is lower than the normal level of backlight power.

16. The article of manufacture of claim 15, wherein the reduced level of backlight power is no backlight power.

17. The article of manufacture of claim 15, wherein the reduced level of color luminance level comprises contrasting color tones selected to allow a specific user to distinguish distinct display elements within the second remainder subset of the first plurality of blocks of the top-focused active window display area of the monitor, and wherein the contrasting color tones are selected to be intelligible to a user having one or more of protanopia, protanomalia, deuteranopia, deuteranomalia, tritanopia and tritanomalia.

18. The article of manufacture of claim 15, wherein the specified number of horizontal rows or vertical columns of the blocks to the focal point within the top-focused active window is three horizontal rows of the blocks that are within an upper area of the top-focused active window and include the focal point.

19. The article of manufacture of claim 15, wherein the computer readable program code instructions, when executed by the computer processing unit, further cause the computer processing unit to initiate visually distinguishing a first task bar subset group of the second plurality of the blocks within the remainder inactive and unselected area of the total display area of the monitor from another subset group of the second plurality of the blocks within the remainder inactive and unselected area of the total display area, by driving the first task bar subset group blocks with display information at the normal level of color luminance and at the normal level of backlight power.

20. The article of manufacture of claim 15, wherein the reduced level of color luminance comprises a predefined low-contrast color combination that causes the monitor to emit a first amount of radiation in rendering the display information from the main monitor board; and wherein the normal level of color luminance comprises a high-contrast color combination that causes the monitor to emit a second amount of radiation in rendering the display information from the main monitor board that is a higher than the first amount of radiation emitted by the monitor.

\* \* \* \* \*